United States Patent [19]

Iyota et al.

[11] Patent Number: 5,124,854
[45] Date of Patent: Jun. 23, 1992

[54] CASSETTE LOADING APPARATUS HAVING AN INNER CASSETTE HOLDER SUPPORTED ON AN OUTER CASSETTE HOLDER

[75] Inventors: Koji Iyota; Ikuo Nishida; Yosiharu Yamasita; Motonori Ohmori; Hidekazu Takeda; Masao Iwakura; Tetsuo Itou, all of Katsuta, Japan

[73] Assignees: Hitachi Ltd.; Hitachi Video Engineering, Incorporated, Kanagawa, Japan

[21] Appl. No.: 510,199

[22] Filed: Apr. 17, 1990

[30] Foreign Application Priority Data

Apr. 24, 1989 [JP] Japan .................................. 1-101633

[51] Int. Cl.⁵ .................. G11B 15/675; G11B 17/022; G11B 5/008
[52] U.S. Cl. .................................. 360/96.6; 360/96.5; 360/99.06
[58] Field of Search .................. 360/96.5, 96.6, 85, 360/93, 99.02, 99.06

[56] References Cited

U.S. PATENT DOCUMENTS

| | | | |
|---|---|---|---|
| 4,794,478 | 12/1988 | Kamezawa et al. | 360/96.6 |
| 4,811,138 | 3/1989 | Park | 360/96.5 |
| 4,835,635 | 5/1989 | Sasaki et al. | 360/96.5 |
| 4,878,138 | 10/1989 | Ando et al. | 360/99.02 |
| 4,918,551 | 4/1990 | Yoshida et al. | 360/96.5 |
| 4,984,112 | 1/1991 | Kletzl et al. | 360/96.6 |

FOREIGN PATENT DOCUMENTS

| | | |
|---|---|---|
| 0203784 | 12/1986 | European Pat. Off. |
| 59-171070 | 9/1984 | Japan |
| 61-271651 | 12/1986 | Japan |
| 2067001 | 7/1981 | United Kingdom |

OTHER PUBLICATIONS

European Search Report EP 90 10 7791.

*Primary Examiner*—Aristotelis Psitos
*Assistant Examiner*—Jefferson Evans
*Attorney, Agent, or Firm*—Antonelli, Terry, Stout & Kraus

[57] ABSTRACT

A slide type cassette loading apparatus includes a loading section for receiving a tape cassette to move the same between an inlet/outlet position and a reference position for loading, and a movable chassis for sliding the cassette, located in the reference position, to a recording/reproducing position while carrying the cassette on the movable chassis. The loading section is of a double structure type which has an outer cassette holder pivotable relative to the movable chassis and an inner cassette holder supported to the outer cassette holder. The inner cassette holder is mounted on the outer cassette holder so as to make a pivotal movement together with the outer cassette holder and be movable in slide directions of the cassette, and is operatively coupled to the movable chassis so as to be movable together with the movable chassis.

7 Claims, 7 Drawing Sheets

LONGITUDINAL DIRECTION
OF CASSETTE

FIG. 7
PRIOR ART

LONGITUDINAL DIRECTION
OF CASSETTE

CASSETTE LOADING APPARATUS HAVING AN INNER CASSETTE HOLDER SUPPORTED ON AN OUTER CASSETTE HOLDER

BACKGROUND OF THE INVENTION

The present invention relates to a cassette loading apparatus for a magnetic recording/reproducing apparatus such as, for example, a video tape recorder (VTR), and, more particularly, to a small-sized light-weight cassette loading apparatus.

A mechanism for loading a magnetic tape recording cassette into a recording/reproducing apparatus has been proposed which includes a slide type mechanism provided with a cassette loading section formed on a movable chassis. After the tape cassette has been loaded in the recording/reproducing apparatus through the loading section, the cassette is positioned in a recording-/reproducing mode by a sliding movement of the movable chassis.

A slide type loading mechanism of the aforementioned type is disclosed in, for example, Japanese Patent Unexamined Publications 59-171070 and 61-271651.

In the loading apparatus disclosed in Japanese Patent Unexamined Publication 59-171070, a cassette holder is mounted on a tape cassette loading section so as to be movable up and down through cross-link type levers. In order to load the tape cassette into the recording/reproducing apparatus, the cassette is inserted into the cassette holder, and the holder is depressed and moved toward the tape cassette loading section. Thus, the tape cassette is loaded in the loading section and, thereafter, the cassette is moved to the recording/reproducing position by the movement of the loading section.

In the loading mechanism disclosed in Japanese Patent Unexamined Publication 61-271651, a cassette holder is pivotably mounted on a slide chassis, with the cassette including inner and outer double holders, and with the outer holder being movable relative to the tape cassette, whereby, even if any external force is applied to the holder after the completion of the tape cassette, such force would not adversely affect the position of the cassette and, at the same time, damage to the slide mechanism is avoided.

In the above-described conventional mechanism, the tape cassette is loaded in a vicinity of the recording/reproducing apparatus. While this is suitable for a camera integrated type portable VTR, there has been a demand that such a VTR be reduced in size and weight. It is thus desired to further miniaturize the tape cassette loading apparatus.

SUMMARY OF THE INVENTION

It is an object of the present invention to provide a small-sized light-weight tape cassette loading apparatus which is operable without fail.

Another object of the invention is to provide a compact light-weight tape cassette loading apparatus having a minimal number of parts and which may be easily manufactured.

Still another object of the invention is to provide a tape cassette loading apparatus which enables a further miniaturization of a portable VTR.

As will be described more fully hereinbelow, the invention is the result of an analysis of conventional structure as disclosed, for example, in Japanese Patent Unexamined Publication 61-271651, to attain the above and other objects of the present invention by further improving the cassette holder mechanism of a VTR.

According to the present invention, a cassette loading apparatus is provided which comprises slide means for moving a tape cassette to and from a recording/reproducing position, and loading means having an inner cassette holder means and an outer cassette holder means for loading the cassette on the slide means, with the outer cassette holder means being pivotable relative to the slide means.

In the cassette loading apparatus of the present invention, the inner holder means is supported by the outer holder means so that the inner holder means is pivotable together with the outer cassette holder means and is slidable in directions of movement of the cassette, and is operatively connected to the slide means so that the inner cassette holder means is moved together with the slide means.

In the above-described arrangement, the inner cassette holder means is supported by the outer cassette holder means, and even if the slide means is moved, the operational supports of the two holder means will not overlap with each other in a longitudinal direction of the cassette. Accordingly, it is possible to reduce the size of the a cassette loading apparatus in a width direction of the cassette, that is, the longitudinal direction of the cassette. This makes it possible to further miniaturize the overall apparatus in cooperation with the feature of the above-described slide loading system.

Also, the operational pivot of the inner and outer cassette holder means is common to thereby reduce the number of parts for supporting the operational pivot, thereby making it easier to manufacture the apparatus and to reduce the overall weight.

Further, since the outer cassette holder means does not slide when the slide means and the inner cassette holder means are moved, no gap or opening is formed in a part of the outer peripheral portion of the apparatus during the slide loading operation so that the internal mechanism of the apparatus is not exposed to the outside.

BRIEF DESCRIPTION OF THE DRAWINGS

The foregoing and other objects, features and advantages of the present invention will become more apparent when taken in conjunction with the following drawings, wherein.

DESCRIPTION OF THE PREFERRED EMBODIMENTS

At the outset, problems inherent in a conventional tape cassette loading apparatus disclosed in Japanese Patent Unexamined Publication 61-271651 will be described.

Figure 7:
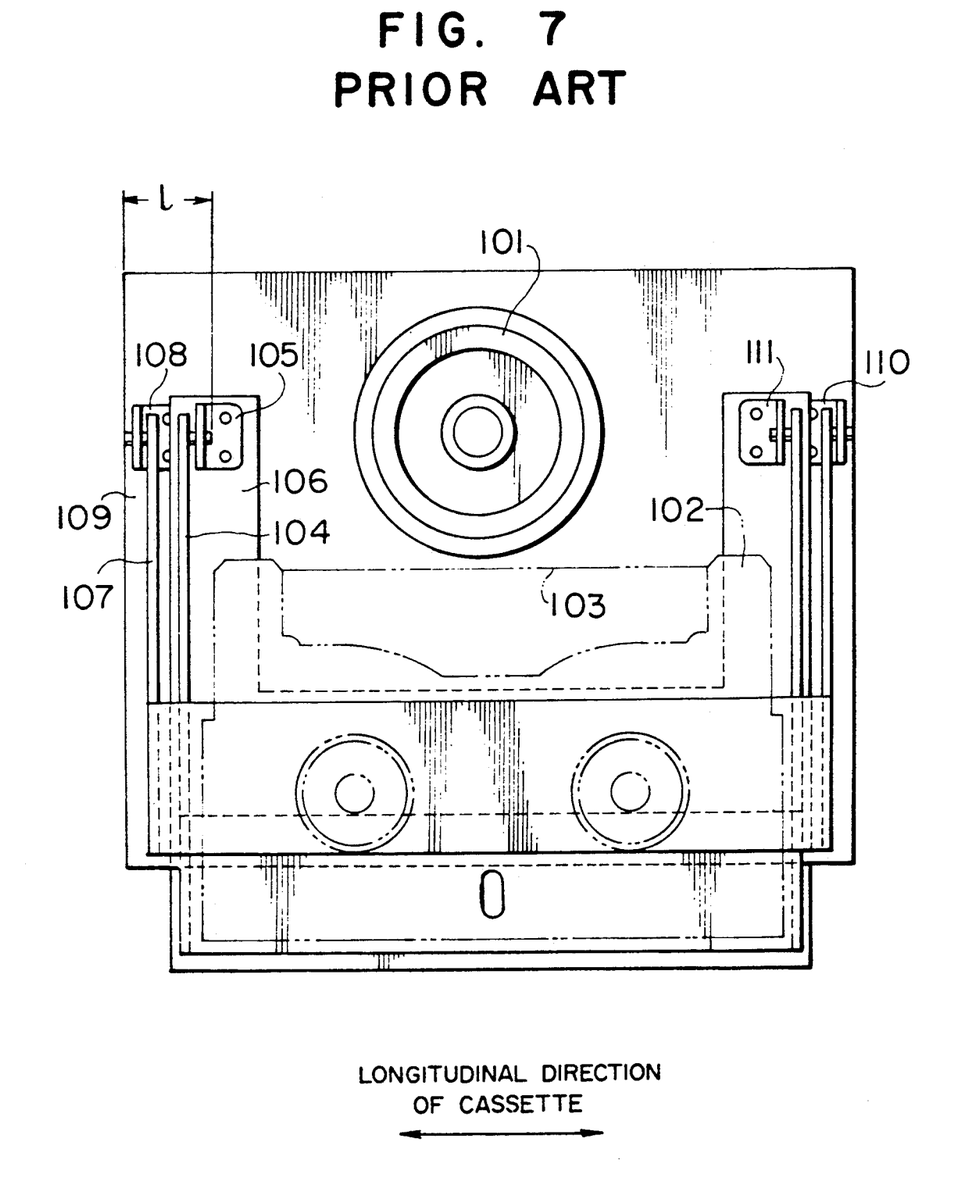
FIG. 7 is a top plan view of a conventional tape cassette loading apparatus.

Referring to FIG. 7, the conventional slide type loading mechanism includes an inner and outer double cassette holder, with the inner cassette holder 104 being pivotally supported to side plates 105 and 111 fixed to a movable chassis 106. The outer cassette holder 107 is pivotally supported to side plates 108 and 110 fixed to a stationary portion 109 such as, for example, a chassis of a VTR. A rotary head drum 101 is mounted on the stationary portion 109. The cassette holders 104 and 107 are adapted to receive a tape cassette 102 and to load the cassette 102 on the movable chassis 106. Subsequently, the cassette 102 is moved toward the drum 101 by the movable chassis 106 and is positioned for a recording/reproducing operation. A tape 103 is received in the cassette 102.

The inner and outer cassette holders 107 pivot in unison relative to the stationary portion 109 and the VTR for loading and unloading the tape cassette 102. For this reason, the pivots of the inner and outer cassette holders 104, 107 are arranged in alignment with each other in the longitudinal direction of the cassette during the pivoting movement. However, in the conventional apparatus, since the pivot points overlap a problem arises in that a distance l increases. Furthermore, it is necessary to provide members for respectively supporting the operational pivots of the inner and outer cassette holders 104, 107. As a result, the number of parts required is increased and, in particular, an increase in the distance l results in an increase in the width of the apparatus thereby precluding miniaturization of the apparatus.

Figure 1:
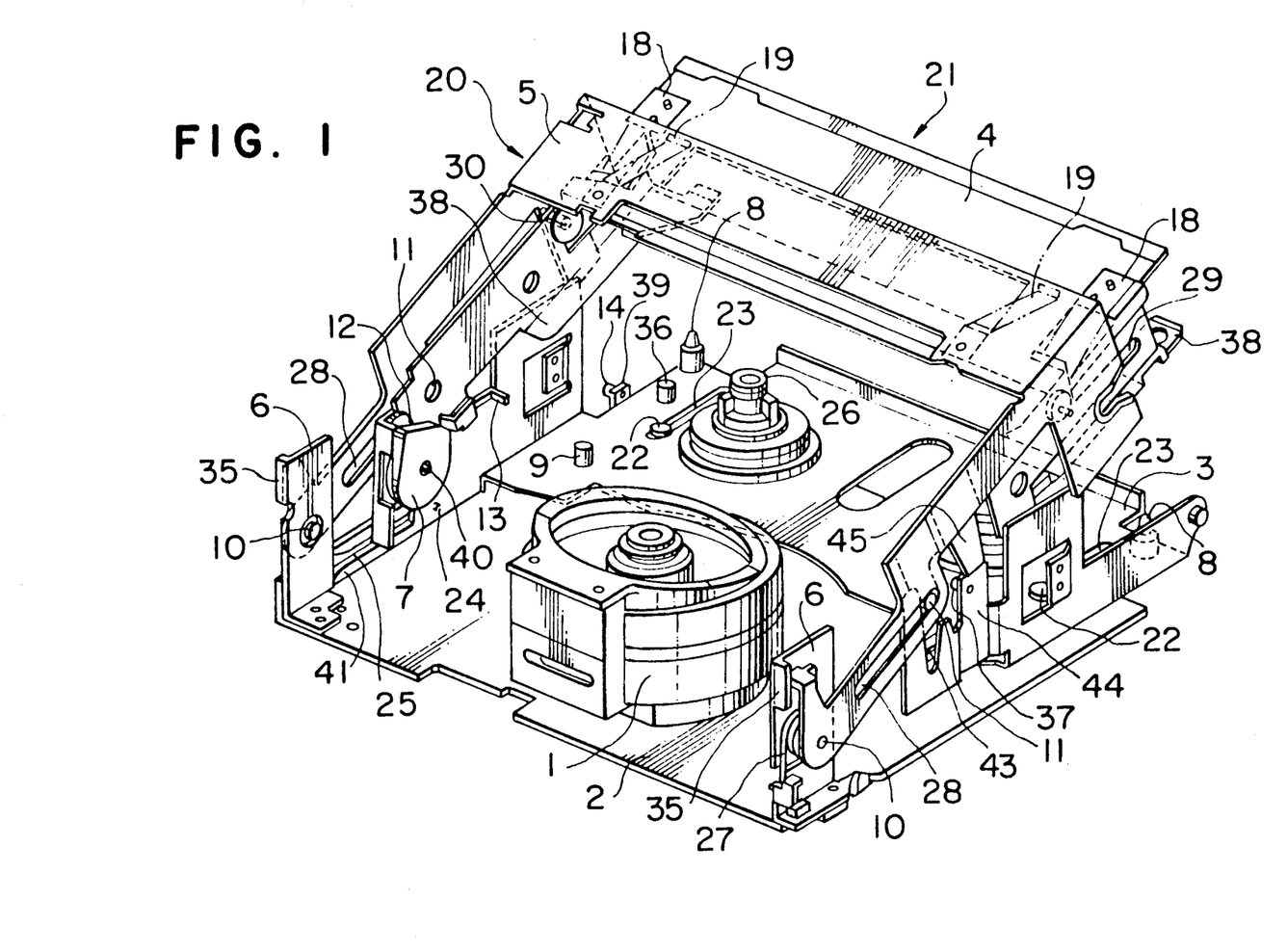
FIG. 1 is a perspective view of a portion of the apparatus illustrating a condition prior to a cassette loading operation.

In accordance with the present invention, as shown in FIG. 1, a VTR includes a cassette loading apparatus comprising a cassette loading section 20 which is pivotable relative to the main chassis 2, that is, pivotable to a stationary portion of the VTR. The cassette loading section includes an inner cassette holder 4 and an outer cassette holder 5. The inner and outer cassette holders 4, 5 have a substantially box-shaped cross-section and are fashioned by bending metallic materials so as to define a cassette insertion opening and a space for receiving the cassette in cooperation with each other.

Figure 2:
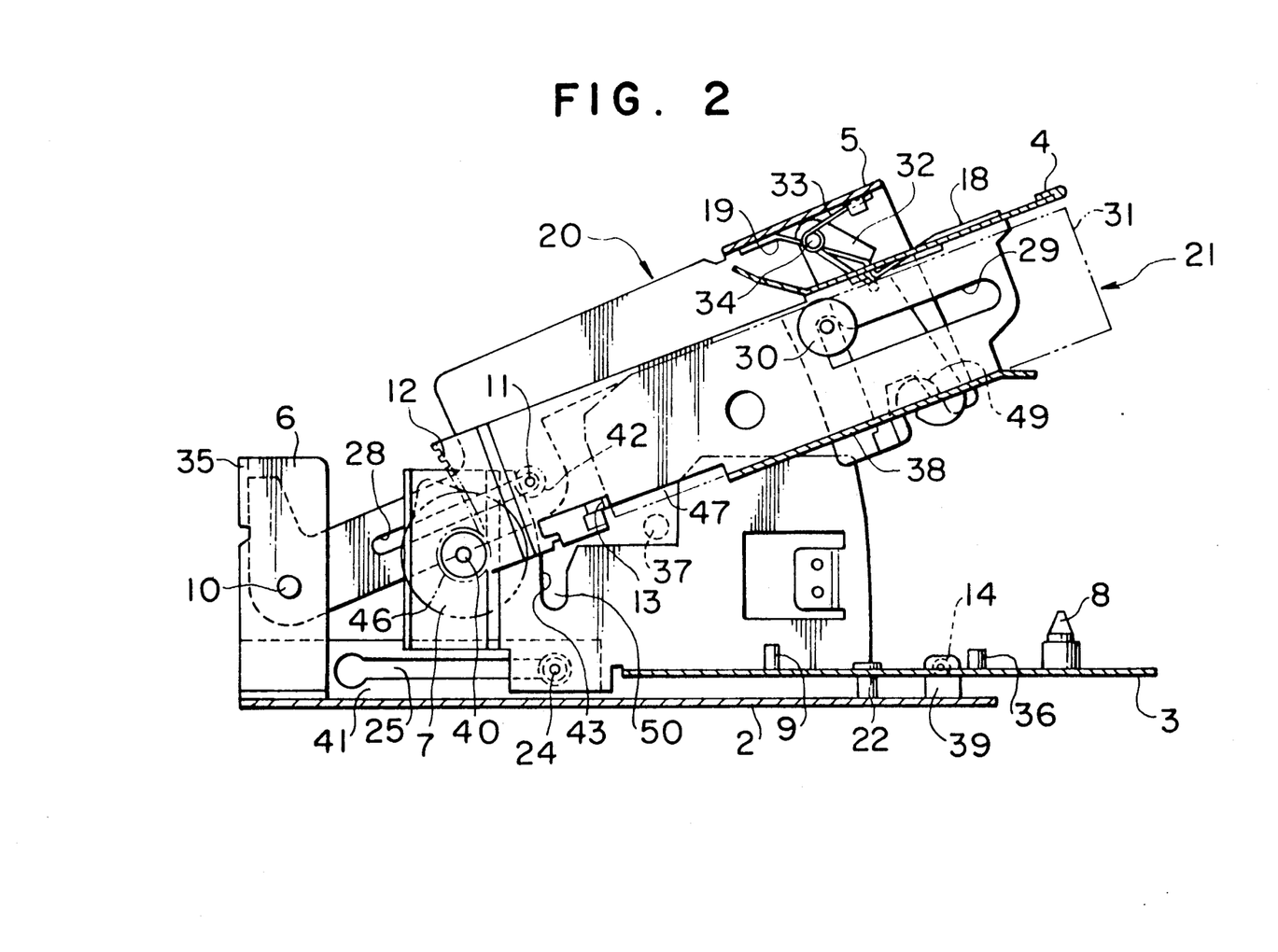
FIG. 2 is a partial cross-sectional view of the portion of the apparatus of FIG. 1.
Figure 3:
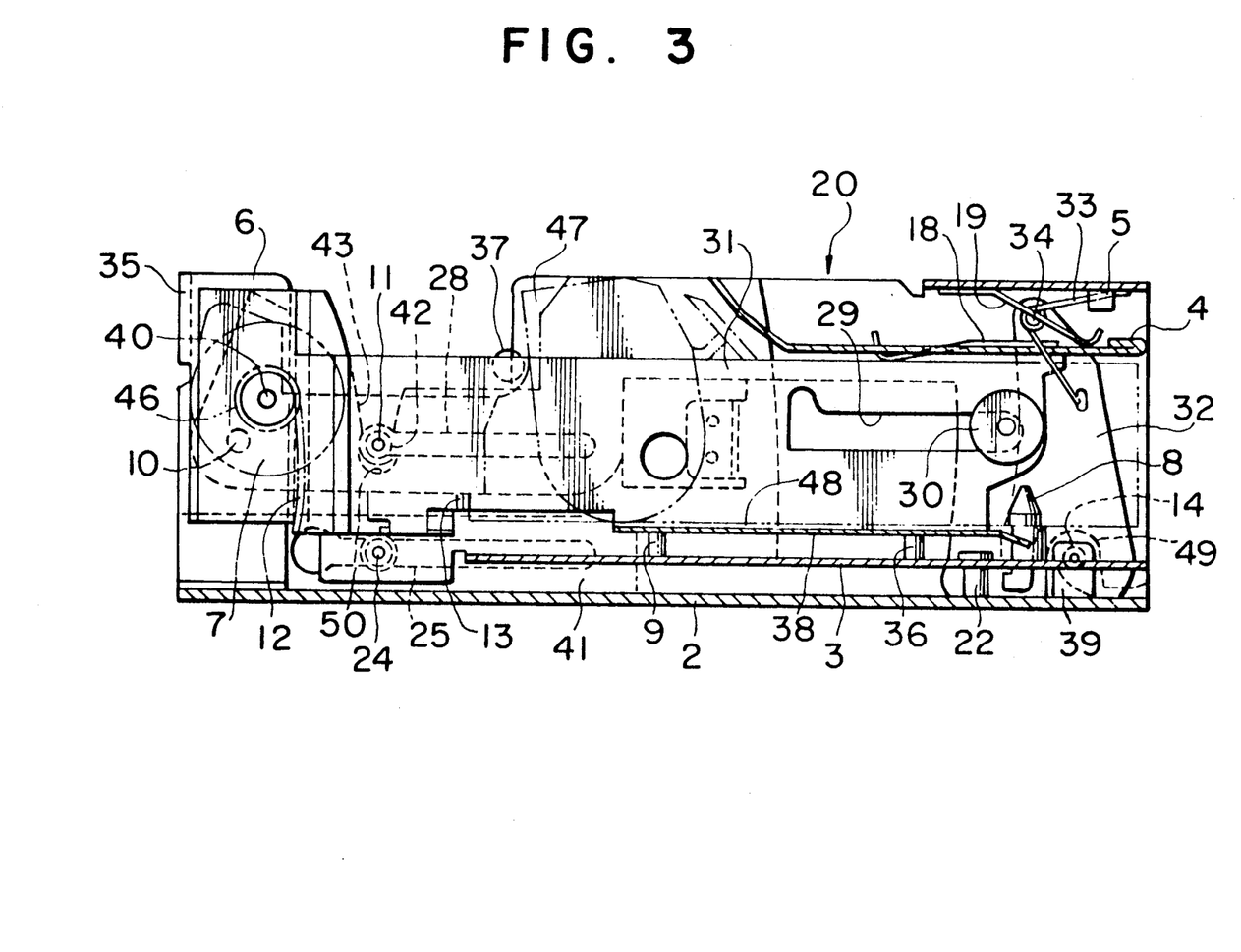
FIG. 3 is a partial cross-sectional view of the portion of FIG. 1 in a cassette loading condition.
Figure 4:
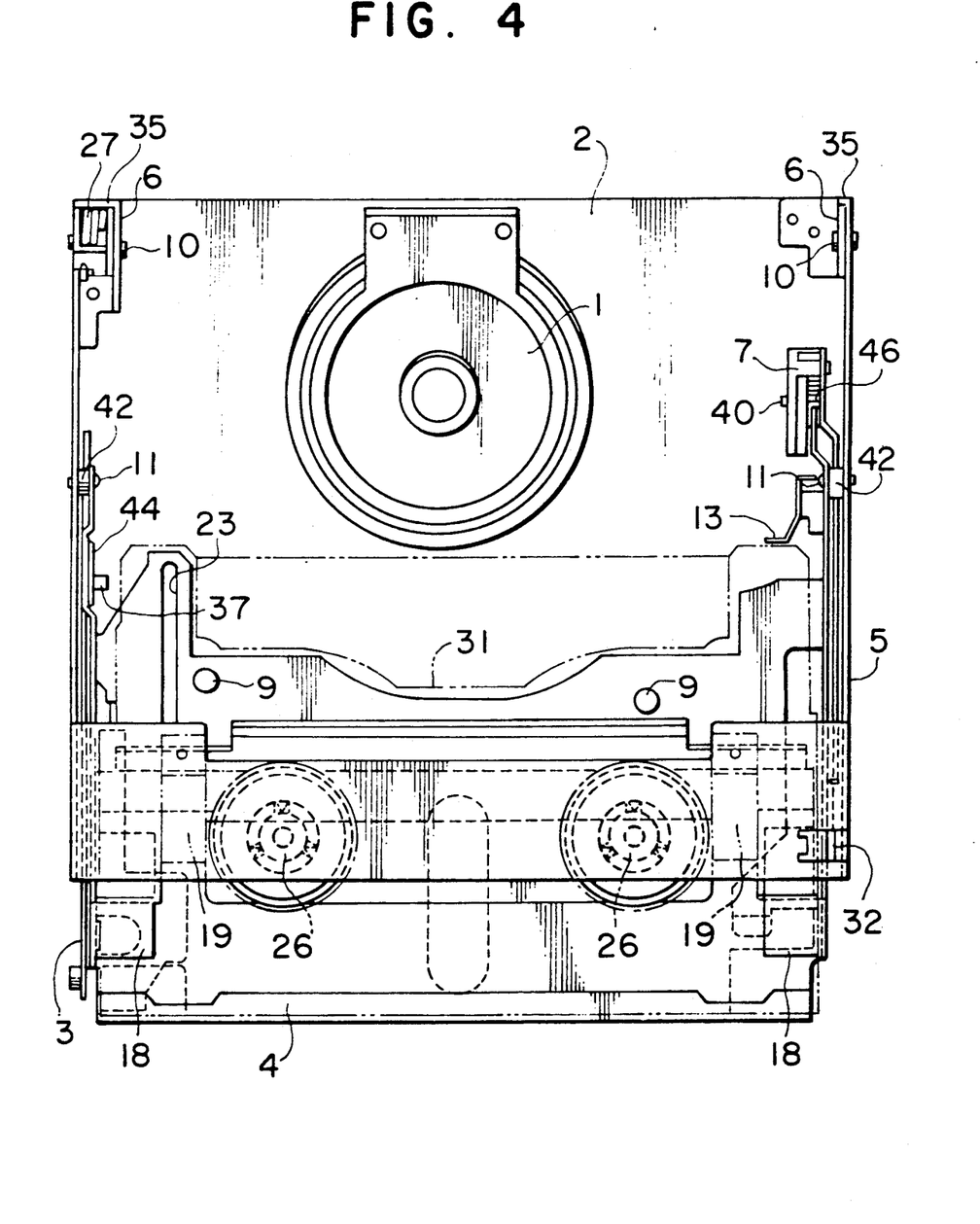
FIG. 4 is a top plan view of the portion of FIG. 2.

The main chassis 2 is fashioned as a substantially rectangular plate, with a rotary head drum 1 being mounted on the main chassis 2, and a pair of side plates 6 being fixed on respective sides of the main chassis 2. A movable chassis 3 is disposed above the main chassis 2, with the movable chassis 3 including a bottom substantially corresponding to the rectangular plate of the main chassis 2, and provided on both sides with upwardly extending bent portions. The movable chassis 3 is connected to a slide mechanism forming the slide means and is slidable in a horizontal direction as shown in FIG. 2 and 3 and substantially in parallel to the main chassis 2. The slide mechanism comprises a drive device including a cam mechanism or rack and pinion mechanism (not shown) interposed between the main chassis 2 and the movable chassis 3. The slide mechanism may be a conventional mechanism such as disclosed in, for example, Japanese Patent Unexamined Publication 59-1710170.

The outer cassette holder is pivotally supported by pivot shafts 10 provided at the respective side plates 6 of the main chassis 2. The inner cassette holder 4 is connected to the outer cassette holder 5 through a pair of outwardly extending engagement pins 11 provided on the inner cassette holder 4 and a pair of inwardly extending engagement pins 30 provided on the cassette holder 5. The engagement pins 11 are slidable engaged with elongated guide holes 28 respectively formed in the bent portions of the outer cassette holder 5. the engagement pins 30 are slidably engaged with elongated guide holes 29 which are respectively formed in the bent portions of the inner cassette holder 4. Accordingly, the inner cassette holder supported inside the outer cassette holder 5 so as to pivot together therewith and is slidable substantially in a radial direction about the pivot shafts 10 relative to the outer cassette holder 5.

The guide holes 28 are arranged so that the engagement pins 11 are located in the vicinity of the rear end portions of the guide holes 28 with respect to the cassette insertion direction in the condition shown in FIG. 2. The guide holes 29 are arranged so that the engagement pins 30 are located in the vicinity of the forward end portions of the guide holes 29 with respect to the cassette insertion direction in the condition shown in FIG. 2.

Coil springs 27 are wound around the pivot shafts 27, with the coil springs 27 causing the outer cassette holder to be biased toward the open direction, that is, in an upward direction in FIG. 1. The upper limit of the outer cassette holder 5 is limited by the abutment of the end portions of the holder with the upper bent portions 35 of the side plates 6.

A pair of leaf springs 19 are fixed to the outer cassette holder at positions thereof facing the upper surface of the inner cassette holder 5. The inner cassette holder 4 is urged in a closing direction, that is, downwardly in FIG. 1, by the leaf springs 19. However, the rotation of the inner cassette holder 4 is limited by the engagement pins 30 of the outer cassette holder 5 prior to the loading of the tape cassette. Also, after the loading of the cassette, the bottom of the inner cassette holder 5 is brought into contact with the height limit pins 36 which are formed on the movable chassis 3, to thereby limit rotation of the inner cassette holder 5.

A gear 12 is provided on one of the bent side portions of the inner cassette holder 4 in a vicinity of the pivot shaft 10. The gear 12 engages a gear 46 of a damper provided on the movable chassis 3 for imparting a dampening force to the rotational motion of the cassette loading section 20. A cassette stopper 13 is provided in the inner cassette holder 4, with the stopper being formed by bending an end portion of the inner cassette holder 4 in a cassette insertion direction. The insertion depth of the tape cassette into the inner cassette holder is defined by the cassette stopper 13. A pair of leaf springs 18 are fixed to an upper portion of the inner cassette holder 4. When the tape cassette 31 is inserted into the inner cassette holder 4, the leaf springs 18 serve to depress the tape cassette against a bottom plate 38 of the inner cassette holder 4 and temporarily retain the cassette as shown in FIG. 2. After the cassette has been loaded, as shown in FIG. 3, the tape cassette 31 is depressed by the leaf springs 18 and is retained by positioning pins 8 and height limit pins 9 of the movable chassis 3, thereby defining a reference position.

An inwardly extending pin 39 is provided on one of the bent side portions of the outer cassette holder as shown in FIGS. 2 and 3. A lock arm 32 is pivotably supported with respect to the pin 34. The lock arm 32 is biased in a clockwise direction about the pin 34 in FIGS. 2 and 3 by a coil spring 33 wound around the pin 34. Prior to loading the cassette 31, the engagement pin 30 of the outer cassette holder 5 restricts the rotation of the lock arm 32. A bent portion is formed in the main chassis at a position corresponding to the lock arm 32. A lock roller 14 is mounted on a side surface of the bent portion 39. The lock roller 14 is engaged with the hook portion formed at distal end of the lock arm 32 for holding the cassette loading section 20 in the horizontal position of FIGS. 2 and 3.

To slidingly guide the movable chassis 3, guide pins 22 extend in an upward direction from the main chassis 2 and elongated guide holes 23 are formed in the bottom of the movable chassis 3. A guide pin 24 is formed in one of the bent side portions of the movable chassis 3, and a bent portion 41 is formed at a position of the main chassis 2 corresponding to the guide pin 24. An elongated guide hole 25 is formed in the bent portions of the main chassis 2. The sliding guiding movement is attained by the guide pins 22 slidingly engaging the respective guide holes 2 and the guide pin 24 slidingly engaging the guide hole 25.

A pair of shafts 26 for driving the reels of the tape cassette 31 and the pins 8, 9 and 36 for positioning the cassette 31 are mounted on a bottom of the movable chassis 3. A pin 37 for lifting the cover of the cassette is provided on one of the bent portions of the movable chassis 3, and a pin 40 is mounted on the other bent portion of the movable chassis 3. The damper 7 is mounted on the movable chassis 3 through the pin 40. Accordingly, these elements or components are moved together with the movable chassis 3.

A vertically extending groove like guide portion 43 is formed in one of the bent portions of the movable chassis 3. The guide portion 43 receives and guides the roller 42 rotatably mounted on one of the engaging pins 11 of the inner cassette holder 4. During the opening and closing motion of the cassette loading section 20, the inner cassette holder 4 is guided in the circumferential direction about the pivot shafts 10 of the outer cassette holder 5 by the engagement of the guide portion 43 and the roller 42, thereby ensuring a smooth operation.

Figure 5:
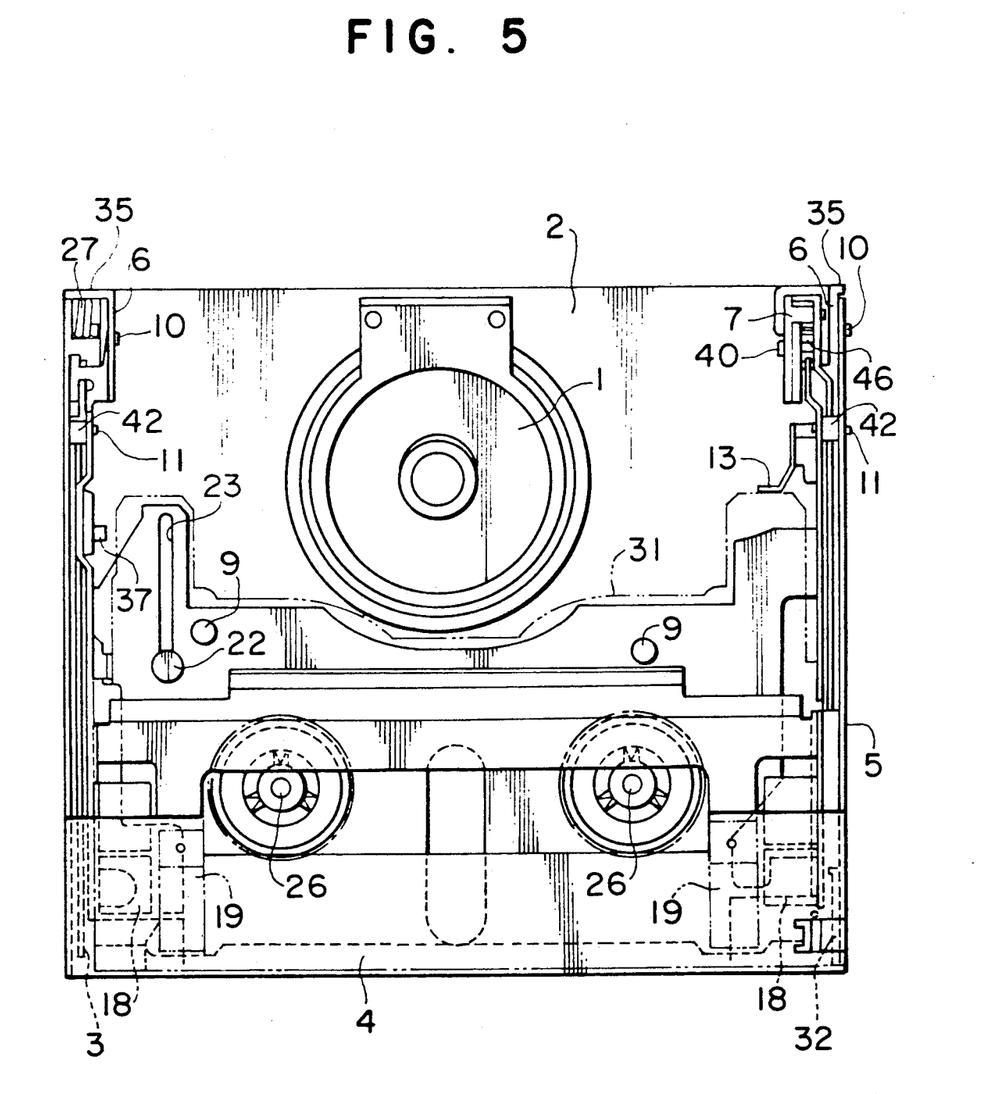
FIG. 5 is a top plan view of the portion of FIG. 3.
Figure 6:
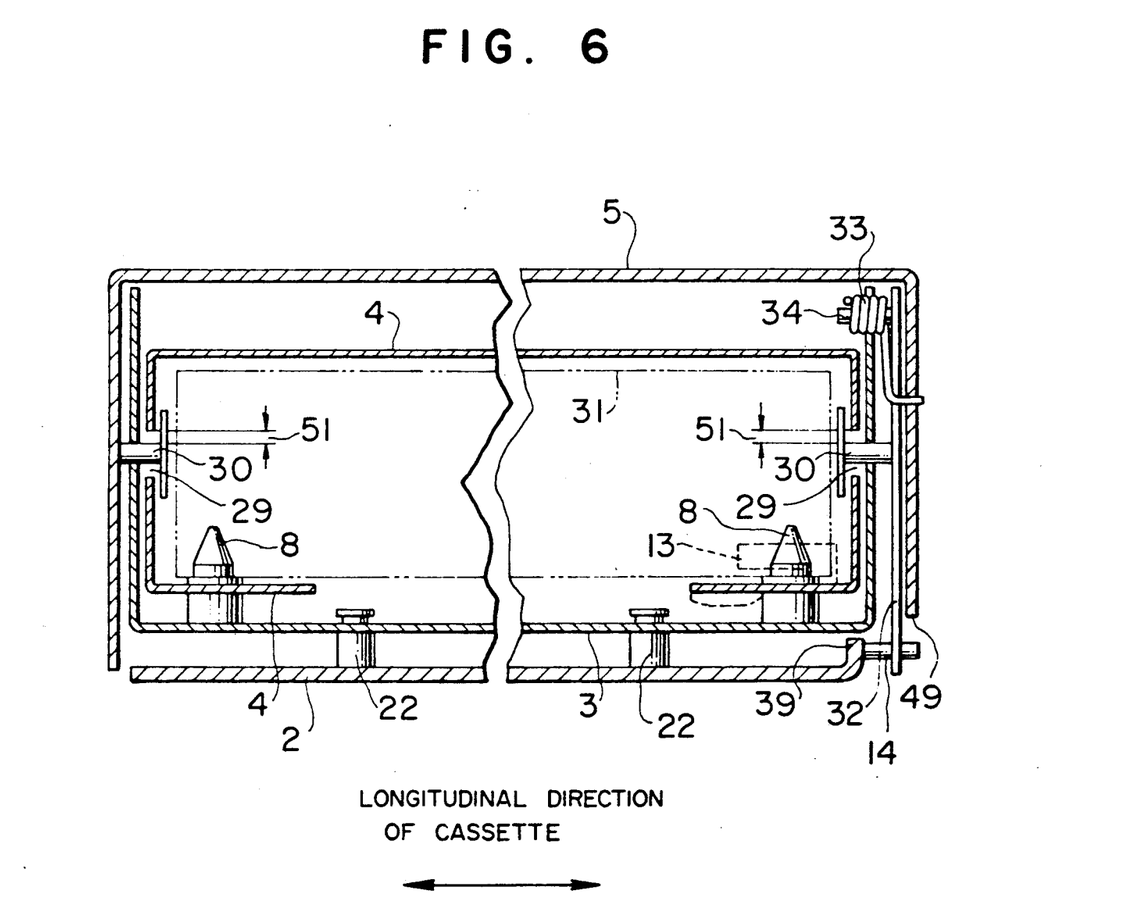
FIG. 6 is a cross-sectional view of the apparatus of FIG. 1, as viewed in a slide direction.

As shown in FIG. 6, from an inner space receiving the cassette to the outside, there are arranged the inner cassette holder 4, the movable chassis 3 and the outer cassette holder 5 at intervals for operation. However, as shown in FIG. 1, a bent part 44 of the bent portion of the movable chassis 3 provided with the pin 37 is located inside the bent portion 44. A bent part 45, extending outwardly beyond the bent part 44 is provided in the bent portion of the inner cassette holder at a position corresponding the bent part 44. Therefore, as shown in FIG. 5, the positional relationship between the inner cassette holder and the movable chassis 3 is reversed at the pin 37 as shown in FIG. 5. With this arrangement, when the cassette holders 4, 5 are pivotally moved, the interference between the inner cassette holder 4 and the pin 37 is avoided. Furthermore, the bent part 45 is slidingly moved on the bent part 44 of the movable chassis 3, whereby the displacement of the inner cassette holder 4 in the longitudinal direction of the cassette is suppressed, and the interference between the inner cassette holder 4 and the movable chassis 3 is avoided.

In FIG. 1, the tape cassette 31 is inserted into the inner cassette holder 4 through the cassette insertion opening 21. At this time, the insertion depth of the cassette holder 4 is restricted by the cassette stopper 13, and, simultaneously therewith, the cassette 31 is depressed by the leaf springs 18 to be held by the inner cassette holder 4.

Subsequently, when the cassette loading section is depressed into the closed position toward the movable chassis 3, the outer cassette holder 5 is rotated about the pivot shafts 10 in a closing direction. The rotational motion is transferred to the inner cassette holder 4 through the engagement pins 11 and 30 and through the leaf springs 19, so that the cassette 31 is moved toward the loading position together with the holder 4. As described above, the inner cassette holder 4 is slidable substantially in the radial direction about the pivot shafts 10 relative to the outer cassette holder by the elongated guide holes 28 of the outer cassette holder 5 and the elongated guide holes 29 of the inner cassette holder 4. However, during this rotational motion, the roller 42, mounted on the engagement pin 11 is engaged with the guide portion 43 of the movable chassis bent portion and is guided in the circumferential direction about the pivot shafts 10. For this reason, the inner cassette holder 4 will not slide but is smoothly moved together with the outer cassette holder.

The tape cassette 31 has a cover 47 at a tip thereof, as viewed in an insertion direction of the cassette 31. The cover 47 is brought into contact with the cover lifting pin 37 of the movable chassis during the loading operation of the tape cassette 31. Thereafter, the cover 47 is opened in accordance with the movement of the tape cassette 31 to expose the magnetic tape incorporated in the cassette 31.

When the cassette loading section 20 is moved to the closed position, the rotatable lock arm 32 of the outer cassette holder 5 is engaged with the lock roller 14 of the main chassis 2, so that the cassette loading section 20 is maintained in the horizontal position. At this time, the reel drive shafts 26 and the positioning pins 8 of the movable chassis 3 are respectively inserted into the reel holes and the reference holes of the bottom of the tape cassette 31, to position the cassette in the horizontal direction. The bottom of the tape cassette 31 contacts the height limit pins 9 to position the cassette in the height direction. Thus, the tape cassette 31 is loaded in the reference position on the movable chassis 3.

When the tape cassette 31 is positioned in the reference position, the height of the inner cassette holder 4 is restricted by an abutment of a bottom thereof with the height limit pins 36 on the movable chassis 3 as shown in FIG. 3. At this time, the bottom of the inner cassette holder 4 is lower than the bottom of the tape cassette 31 positioned in the reference position. Namely, the inner cassette holder 4 is positioned so that a small gap 48 results between the bottom 38 of the inner cassette holder 4 and the bottom of the tape cassette 31. For this reason, the inner cassette holder 4 does not adversely affect the height positioning of the tape cassette 31.

An arcuate cutout 49 is formed at the lower end of the bent side portion of the outer cassette holder 4 at a position corresponding to the lock roller 14 of the main chassis 2. This cutout 49 is adapted to contact the lock roller 14 when an external force is applied to the cassette loading section 20, and to restrain the cassette loading section 20 from being displaced beyond a predetermined amount.

When the lock arm 32 is engaged with the lock roller 14 to complete the locking operation of the cassette loading section 20, a lock detection switch (not shown) is operated to start a motor of the slide mechanism. The driving operation of the motor causes the movable chassis 3 to move toward the rotary head drum !. At this time, a bottom 50 of the guide portion 43 of the movable chassis 3 depresses the roller 42 of the inner cassette holder 4 so that the roller 42 is moved along the elongated guide hole 28 of the outer cassette holder 5. In accordance with this movement, the guide holes 29 of the inner cassette holder 4 are also moved on the respective engagement pins 30 of the outer cassette holder 5. As a result, the inner cassette holder 4 is moved together with the movable chassis 3 to change a relative position with respect to the outer cassette holder 5. The tape cassette 31 is moved together with the inner cassette holder 4, thus being positioned in a recording/reproducing mode.

As shown in FIG. 6, a space or distance 51 is defined between each guide holes 29 of the inner cassette holder 4 and the corresponding engagement pin 30. In the same manner, a space or distance is defined between each guide hole 28 of the outer cassette holder 5 and the corresponding engagement pin 11. Accordingly, even if an external force is applied to the cassette loading section 20 after the cassette loading section 20 is locked and prior to the completion of the tape loading operation by the movement of the movable chassis 3, the movement of the movable chassis 3 may nevertheless be carried out. Namely, even if the outer cassette holder 5 is displaced, the space 51 may absorb the displacement, and only the biasing force by the leaf springs 18 and 19 is applied to the inner cassette holder 4, so that in the same manner, any other restriction force than the biasing force of the leaf springs 18 is not applied to the tape cassette 31.

During the unloading operation of the tape cassette 31, the above-described operation is performed in the opposite order. More particularly, the movable chassis 3 is returned together with the inner cassette holder 4 and the tape cassette 31 When the returning operation of the movable chassis 3 is completed, a cam mechanism (not shown) is operated to rotate the lock arm 32 to disengage the lock arm 32 from the lock roller 14. Then the outer cassette holder 5 is raised by the biasing force of the coil spring 27 to the position shown in FIG. 2. At this time, the inner cassette holder 4 follows the movement of the outer cassette holder 5 by the engagement pins 11 and 30 and is raised, with the tape cassette 31 also being raised therewith.

In this upward movement, since the gear 12 of the inner cassette holder 4 is engaged with the gear 46 of the damper 7, a damper force is applied to the cassette loading section 20 to ensure a smooth rotation.

Although the present invention has been described on the basis of the foregoing embodiment, it should be appreciated that the present invention is not limited solely to the specific form of the embodiment and it is possible for the invention to make various modifications or take any other forms without departing from the scope defined by the appended claims.

What is claimed is:

1. A cassette loading apparatus comprising:
slide means for moving a tape cassette into and out of a recording/reproducing position; and
loading means having an inner cassette holder and an outer cassette holder for loading said cassette on said slide means,
wherein said outer cassette holder is pivotably mounted with respect to said slide means, and said inner cassette holder is supported by said outer cassette holder so as to be pivotable together with said outer cassette holder and slidably movable in directions of movement of said tape cassette and operatively connected to said slide means so as to be movable together with said slide means, and
wherein said inner cassette holder is supported by said outer cassette holder by engagement between a plurality of engagement pins provided on one of said inner and outer cassette holders and a plurality of elongated holes formed in the other of said inner and outer cassette holders, and at least one of said engagement pins is engaged with a guide groove which is formed in said slide means and extends in a circumferential direction about a pivot center of said outer cassette holder.

2. The apparatus according to claim 1, wherein said holes have a diameter larger than a diameter of said engagement pins, whereby, even if an external force is applied during operation, a displacement of said outer cassette holder is absorbed to avoid any adverse affect against said inner cassette holder and said slide means.

3. The apparatus according to claim 1, wherein said inner cassette holder is depressed toward said slide means by spring members fixed to said outer cassette holder, said inner cassette holder is provided with first spring members and second spring members for depressing said tape cassette, received in said inner cassette holder, toward a bottom portion of said inner cassette holder, whereby, when said cassette is loaded on said slide means, the bottom portion of said inner cassette holder is separated from said tape cassette to position said tape cassette.

4. An apparatus for loading/unloading a cassette accommodating a magnetic recording tape, the apparatus comprising:
loading means for receiving the tape cassette and moving said tape cassette between a cassette inlet/outlet position and a reference position for loading/unloading, said loading means including an outer cassette holder pivotable with respect to said slide means and an inner cassette holder for defining a space for receiving said tape cassette;
slide means for carrying the tape cassette positioned in the reference position to move said tape cassette between said reference position and a recording/reproducing position;
engagement means for supporting said inner cassette holder within said outer cassette holder so that said inner cassette holder is slidingly movable in directions of movement of the tape cassette; and
guide means for restricting a sliding movement of said inner cassette holder during the pivotal motion of said outer cassette holder to allow said inner cassette holder to make a pivotal movement together with said outer cassette holder and for coupling said slide means and said inner cassette holder with each other during the movement of said slide means to move said slide means and said inner cassette holder together, and
wherein said engagement means includes a plurality of engagement pins provided on one of said inner and outer cassette holder and a plurality of longitudinally elongated holes provided in the other of said inner and outer cassette holders to engage with said pins, said guide means includes a guide groove provided in said slide means and extending in a circumferential direction about a pivot center of said outer cassette holder, and said guide groove is engaged with at least one of said engagement pins.

5. The apparatus according to claim 4, wherein said holes have a diameter larger than a diameter of said engagement pins, whereby even if an external force is applied during operation, a displacement of said outer cassette holder is absorbed to avoid any adverse affect against said inner cassette holder and said slide means.

6. The apparatus according to claim 4, wherein said inner cassette holder is depressed toward said slide means by spring members fixed to said outer cassette holder, said inner cassette holder is provided with first spring members and second spring members for depressing said tape cassette, received in said inner cassette holder, toward a bottom portion of said inner cassette holder, whereby, when said tape cassette is loaded on said slide means, the bottom portion of said inner cassette holder is separated from said tape cassette to position said tape cassette.

7. An apparatus for loading a cassette accommodating a magnetic recording tape, the apparatus comprising:
  slide means for carrying a cassette located in a reference position to move said cassette into and out of a position for recording/reproducing; and
  loading means for moving said cassette in a loading direction to position said cassette at said reference position, said loading means including an inner cassette holder and an outer cassette holder for defining a cassette insertion opening and a cassette receiving space, said outer cassette holder having an operational pivot at a stationary portion of said apparatus, said inner cassette holder is pivotally mounted on said outer cassette holder so as to be slidable substantially in a radial direction about the operational pivot of said outer cassette holder, said inner cassette holder being movable with a movement in a loading direction of said outer cassette holder through spring members and members for connection with said outer cassette holder and being moved in accordance with a movement of said slide means, and
  wherein said inner cassette holder is supported by said outer cassette holder by engagement between a plurality of engagement pins provided one of said inner and outer cassette holders and a plurality of elongated holes formed in the other of said inner and outer cassette holders, and at least one of said engagement pins is engaged with a guide groove formed in said slide means and extending in a circumferential direction about a pivot center of said outer cassette holder.

* * * * *